(12) United States Patent
Cho (10) Patent No.: US 6,847,429 B2
(45) Date of Patent: Jan. 25, 2005

(54) METHOD OF ADJUSTING A SUBSTRATE SIZE OF LIQUID CRYSTAL DISPLAY DEVICE

(75) Inventor: Min Gu Cho, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 73 days.

(21) Appl. No.: 10/152,070

(22) Filed: May 22, 2002

(65) Prior Publication Data

US 2003/0063228 A1 Apr. 3, 2003

(30) Foreign Application Priority Data

May 22, 2001 (KR) .......................... 2001-27894

(51) Int. Cl.$^7$ .......................... G02F 1/1337; G02F 1/13
(52) U.S. Cl. .......................... 349/191; 349/187
(58) Field of Search .......................... 349/153, 158, 349/187, 190–192; 324/770

(56) References Cited

U.S. PATENT DOCUMENTS

| | | | | |
|---|---|---|---|---|
| 5,426,522 A | * | 6/1995 | Takahara et al. | 349/92 |
| 6,304,311 B1 | * | 10/2001 | Egami et al. | 349/189 |
| 6,507,385 B1 | * | 1/2003 | Nishiyama et al. | 349/156 |

* cited by examiner

*Primary Examiner*—Dung T. Nguyen
(74) *Attorney, Agent, or Firm*—Morgan Lewis & Bockius LLP

(57) ABSTRACT

A method of adjusting a size of a substrate of a liquid crystal display device includes determining if first and second substrates that are sealed together and have a liquid crystal material disposed therebetween are mutually aligned, one of the first and second substrates having a deposition layer formed thereupon, and controlling an amount of deposition stress of the deposition layer when the first and second substrates are not mutually aligned.

18 Claims, 11 Drawing Sheets

COMPRESSIVE MODE

FIG. 4C
RELATED ART

TENSILE MODE

METHOD OF ADJUSTING A SUBSTRATE SIZE OF LIQUID CRYSTAL DISPLAY DEVICE

The present invention claims the benefit of Korean Patent Application No. P2001-27894 filed in Korea on May 22, 2001, which is hereby incorporated by reference.

BACKGROUND OF THE INVENTION

1. Field of the Invention

The present invention relates to a liquid crystal display, and more particularly to a method of adjusting a substrate size of liquid crystal display device.

2. Description of the Related Art

A liquid crystal display (LCD) controls a light transmittance of individual liquid crystal cells according to a video signal, thereby displaying image data (images). An active matrix type LCD is suitable for displaying moving images by a switching device that drives the individual liquid crystal cells. Presently, a thin film transistor is commonly used as the switching device in the active matrix type LCD.

Figure 1:
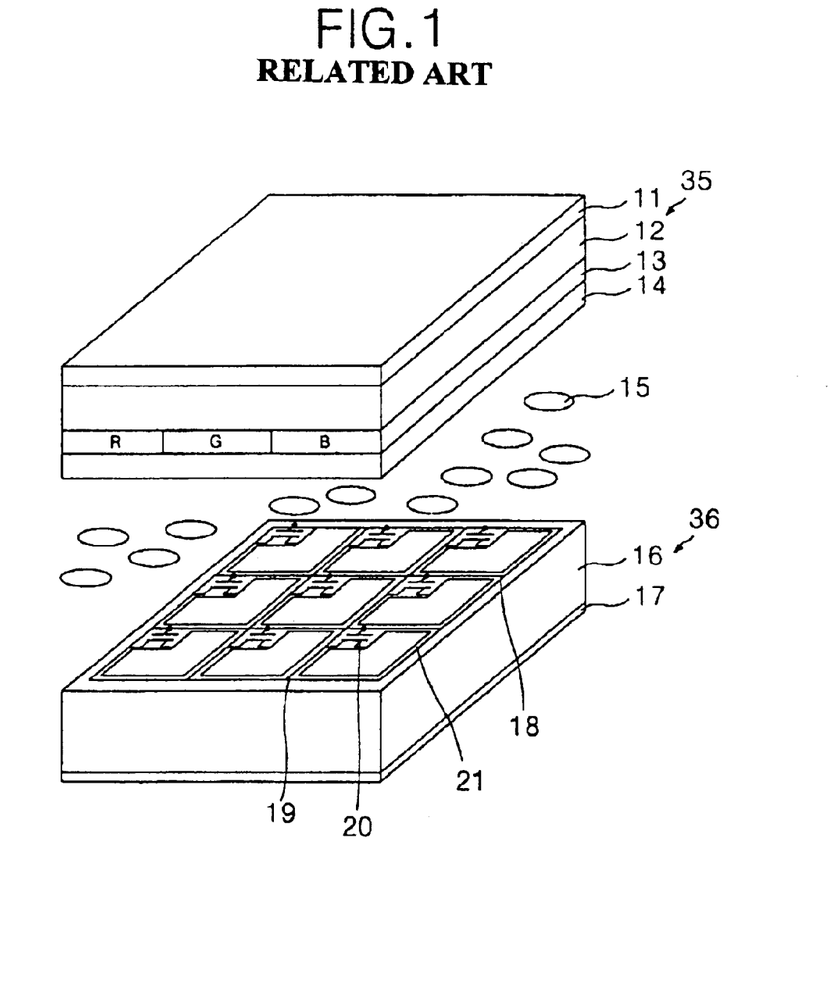
FIG. 1 is a perspective view of a liquid crystal display device according to the related art.

FIG. 1 is a perspective view of a liquid crystal display device according to the related art. In FIG. 1, an active matrix type LCD includes a color filter substrate 35 and a thin film transistor (TFT) substrate 36 that are sealed together having a liquid crystal molecules 15 disposed therebetween. In a transmittance type LCD, a backlight unit (not shown) is disposed at a rear portion of the TFT substrate 36, thereby irradiating incident light to the TFT substrate 36. The liquid crystal molecules 15 are injected between the color filter substrate 35 and the TFT substrate 36. Liquid crystal molecules 15 rotate in response to an applied electric field, thereby controlling a transmissivity of the incident light via the TFT substrate 36.

The color filter substrate 35 includes an upper substrate 12 having a color filter 13, a common electrode 14, and a polarizer 11. The color filter 13 and the common electrode 14 are disposed on a rear side of the upper substrate 12. The color filter 13 has color filter layers of red, green and blue disposed in a shape of stripes to transmit specific wavelength bands of the incident light, thereby displaying colored light. A black matrix (not shown) is formed between the color filters 13, thereby absorbing any of the incident light from between adjacent cells.

The TFT substrate 36 includes a lower substrate 16 having a gate line 18, a data line 19, and a polarizer 17. The gate line 18 and the data line 19 are formed to cross each other on a front side of the lower substrate 16. A TFT 20 is formed at the intersection of the gate line 18 and the data line 19, and a pixel electrode 21 is formed in a matrix array in a cell area between the gate line 18 and the data line 19. The TFT 20 switches a data transmission path between the data line 19 and the pixel electrode 21 in response to a scanning signal from the gate line 18 to drive the pixel electrode 21.

The polarizer 11 is disposed on a front side of the upper substrate 12, and the polarizer 17 is attached on a rear side of the lower substrate 16. The polarizers 11 and 17 transmit polarized light along one direction. When the liquid crystal molecules 15 are aligned at a 90° twisted nematic (TN) mode, polarizing directions of the liquid crystal molecules 15 are perpendicular to each other. Alignment films (not shown) are formed on the rear side of the upper substrate 12 and the rear side of the lower substrate 16.

A fabricating process for manufacturing an active matrix type liquid crystal display device includes cleaning the upper and lower substrates 12 and 16, patterning the upper and lower substrates 12 and 16, forming alignment films on the upper and lower substrates 12 and 16, scaling the upper and lower substrates 12 and 16, injecting the liquid crystal molecules between the upper and lower substrates 12 and 16, and mounting and testing the active matrix type liquid crystal display device.

Cleaning the upper and lower substrates 12 and 16 includes a process that eliminates any impurities from the upper and lower substrates 12 and 16 with cleansing agents.

Patterning the upper and lower substrates 12 and 16 includes processes for patterning the upper substrate 12 and patterning the lower substrate 16. The process for patterning the upper substrate 12 includes sequentially forming the black matrix (not shown), the color filter 13, and the common electrode 14. The process for patterning the lower substrate 16 includes forming the gate line 18, the data line 19, the TFT 20, and the pixel electrode 21.

Figure 2:
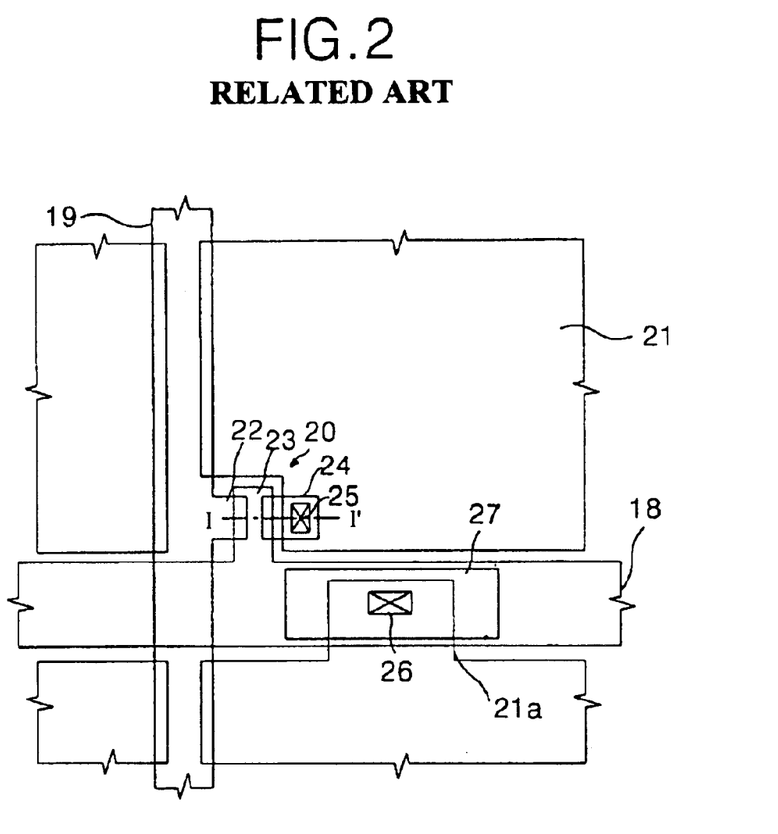
FIG. 2 is a plane view of a thin film transistor (TFT) and a pixel electrode of the liquid crystal display device shown in FIG. 1 according to the related art.
Figure 3:
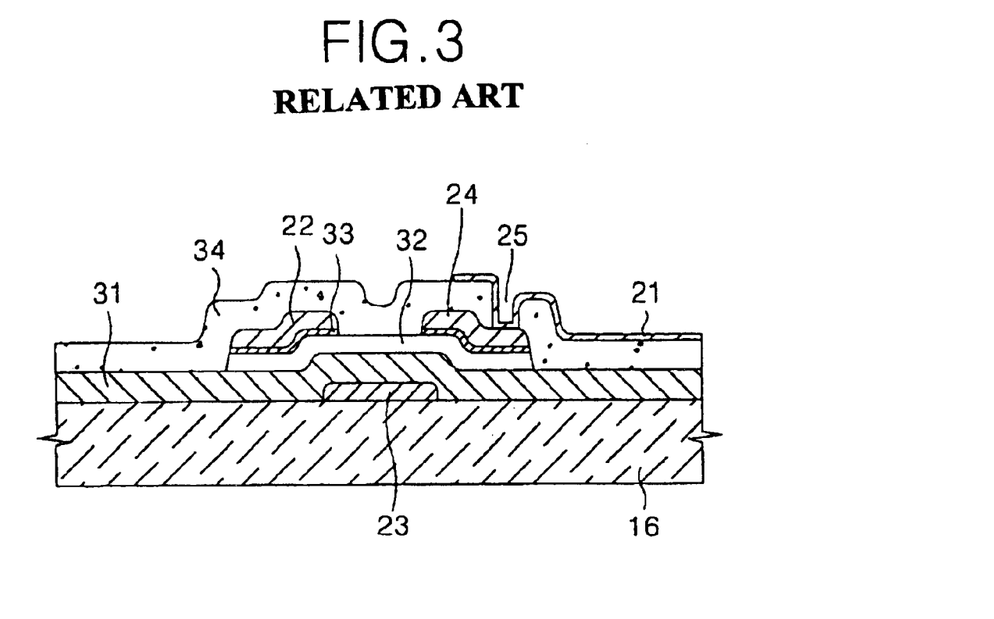
FIG. 3 is a cross sectional view taken along I-I' of FIG. 2 according to the related art.

FIG. 2 is a plane view of a thin film transistor (TFT) and a pixel electrode of the liquid crystal display device shown in FIG. 1 according to the related art, and FIG. 3 is a cross sectional view taken along I–I' of FIG. 2 according to the related art.

In FIGS. 2 and 3, the fabricating process of the TFT 20 begins with a process of depositing a gate metal on an entire surface of the lower substrate 16 by a sputtering method or an electroless plating method. The gate metal includes chromium (Cr), molybdenum (Mo) or an aluminum-alloy metal. The aluminum-alloy metal includes a multilayer structure of Aluminum-Neodymium (AlNd) and Aluminum-Molybdenum (AlMo). Accordingly, the aluminum-alloy metal has a low resistance to compensate for signal delay caused by the molybdenum layer. Subsequently, a mask is aligned on the lower substrate 16, and the gate metal layer is patterned by a photolithographic process that includes exposure and development processes, thereby forming the gate line 18 and the gate electrode 23 of the TFT 20.

Next, an insulating material is deposited on an entire surface of the lower substrate 16 over the gate line 18 and the gate electrode 23 to form a gate insulating layer 31. Inorganic insulating materials such as silicon oxide ($SiO_x$) and silicon nitride ($SiN_x$) may be used to form the gate insulating layer 31.

Next, semiconductor and impurities-doped semiconductor materials are continuously deposited on top of the gate insulating layer 31 by the chemical vapor deposition (CVD) process. Subsequently, the semiconductor and impurities-doped semiconductor materials are patterned by a dry etching process after alignment of a mask to form an active layer 32 and an ohmic contact layer 33. Amorphous silicon or undoped polycrystalline silicon may be used as materials with which to form the semiconductor material. Likewise, amorphous silicon or polycrystalline silicon doped with n-type or p-type impurities at a high concentration may be used as materials with which to form the impurities-doped semiconductor material.

A source and drain metal layer is deposited on an entire surface of the lower substrate 16 including the active layer 32 and the ohmic contact layer 33. Molybdenum (Mo), titanium (Ti), and tantalum (Ta) are used as the source and drain metal layer. Subsequently, the source and drain metal layer is patterned by wet etching process after alignment of a mask. The patterned source and drain metal layer form a source electrode 22, a drain electrode 24, and a storage capacitor electrode 27 of the TFT 20. The source electrode 22 is connected to the data line 19 and the storage capacitor electrode 27, and overlaps with the gate line 18 and the gate insulating layer 31. The ohmic contact layer 33 is dry-etched to form portions over the source electrode 22 and the drain electrode 24, whereby a central portion of the ohmic contact layer 33 is eliminated.

A passivation layer 34 including an inorganic or organic insulating film is formed on the lower substrate 16 including the source electrode 22 and the drain electrode 24. Silicon oxide ($SiO_x$) and silicon nitride ($SiN_x$) can be used for the inorganic insulating film, and an acrylic organic compound, benzocyclobutene (BCB) and perfluorocyclobutane (PFCB), can be used for the organic insulating film. Then, contact holes 25 and 26 are formed in the passivation layer 34 exposing one end of the drain electrode 24 and one end of the storage capacitor electrode 27.

A transparent conductive material is deposited on an entire surface of the passivation layer 34 where the contact holes 25 and 26 are formed. Any one of indium tin oxide (ITO), tin oxide (TO) or indium zinc oxide (IZO) can be used for the transparent conductive material. Subsequently, the transparent conductive material is patterned by a mask alignment process and a dry etching process. The patterned transparent conductive material becomes the pixel electrode 21. The pixel electrode 21 is electrically connected to the drain electrode 24 of the TFT 20 via the contact hole 25. In addition, an upper projected portion 21a of the pixel electrode 21 is electrically connected to the storage capacitor electrode 27 via the contact hole 26.

When the passivation layer 34 is made of the organic insulating material with low dielectric constant for high aperture ratio, a side of the pixel electrode 21 overlaps with the gate line 18 or the data line 19, as shown in FIG. 2.

During the substrate sealing process, an alignment film is spread on the upper and lower substrates 12 and 16, and rubbed. Subsequently, the upper and lower substrates 12 and 16 are sealed by use of a sealant. Then, a liquid crystal injecting process and injection hole sealing process are sequentially conducted after the substrates sealing process.

During mounting of the active matrix type liquid crystal display device, a tape carrier package (TCP) that includes integrated circuits (IC) is mounted to function as a gate drive IC and a data drive IC (not shown) connected to pads of the gate and data lines 18 and 19 formed on the lower substrate 16. During testing of the active matrix type liquid crystal display device, a judgment is made whether or not the active matrix type liquid crystal display device functions properly. Specifically, during the testing, bad pixels are detected by applying test pattern data to the data line 19 and applying scanning signals to the gate line 18 to drive the liquid crystal cell. The bad pixels are detectable as dark points.

During the fabricating process for manufacturing the active matrix type liquid crystal display device, the size of the upper and lower substrates 12 and 16 are changed due to stresses applied to the upper and lower substrates 12 and 16 during deposition of materials. Accordingly, if the sizes of the upper and lower substrates 12 and 16 are changed in differing amounts, the TFT substrate 36 and the color filter substrate 35 will not be accurately sealed. The stresses are defined as a force applied to the upper and lower substrates 12 and 16 per unit area, and the unit is expressed by "$dyne/cm^2$."

Figure 4A:
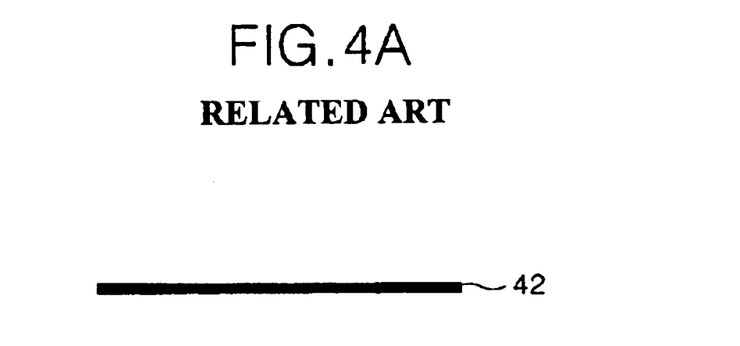
FIG. 4A is a cross sectional view of a bare glass substrate where no deposition layer is formed according to the related art.
Figure 4B:
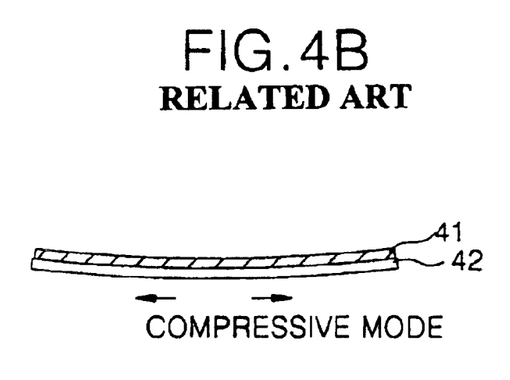
FIG. 4B is a cross sectional view of a substrate during a compressive mode by a deposition layer according to the related art.
Figure 4C:
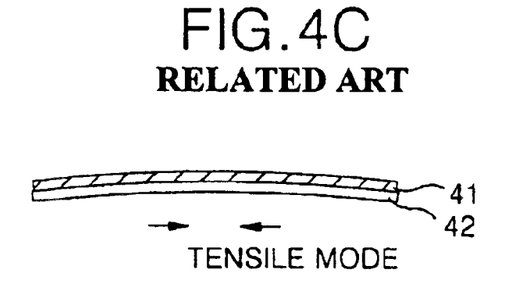
FIG. 4C is a cross sectional view of a substrate during a tensile mode by a deposition layer according to the related art.

FIG. 4A is a cross sectional view of a bare glass substrate where no deposition layer is formed according to the related art, FIG. 4B is a cross sectional view of a substrate during a compressive mode by a deposition layer according to the related art, and FIG. 4C is a cross sectional view of a substrate during a tensile mode by a deposition layer according to the related art. In FIG. 4A, a bare glass substrate 42 exists having parallel planar surfaces where no deposition layer is formed.

In FIGS. 4B and 4C, when a deposition layer 41 is deposited on a substrate 42, stress is imparted to the substrate 42, thereby deforming of the substrate 42. The stress caused by the deposition layer 41 can vary in size and direction according to physical properties of the substrate 42 and the deposition layer 41. The physical properties include internal factors such as differences between thermal expansion coefficients of the substrate material and the deposition layer material, and external factors such as deposition conditions. For example, in FIG. 3, the gate insulating layer 31 and/or the passivation layer 34 have a significant influence upon stresses imparted to the substrate 16.

In FIG. 4B, the deformation of the substrate 42 is due to stress generated by a compressive mode where edges of the substrate 42 bend upward. In the compressive mode, a length of the substrate 42 increases because a force is imparted to the substrate 42 from a central portion toward the edges.

In FIG. 4C, the deformation of the bare glass substrate 42 is due to stress generated by a tensile mode where edges of the bare glass substrate 42 bend downward. In the tensile mode, a length of the substrate 42 decreases because a force is imparted to the substrate 42 from the edges toward a central portion.

Figure 5:
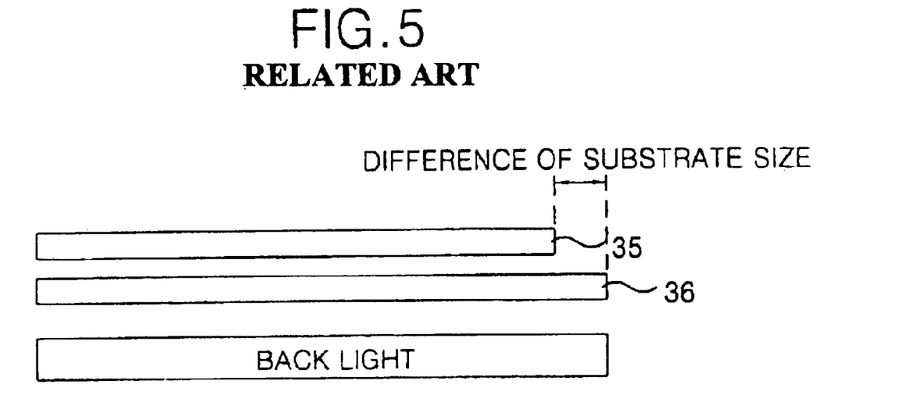
FIG. 5 is a cross sectional view showing a difference between a color filter substrate and a TFT substrate due to a compressive mode according to the related art.

FIG. 5 is a cross sectional view showing a difference between a color filter substrate and a TFT substrate due to a compressive mode according to the related art.

FIG. 5 is a cross sectional view showing a difference between a color filter substrate and a TFT substrate due to a compressive mode according to the related art. In FIG. 5, stress is imparted to the TFT substrate 36 in the compressive mode such that the size of the TFT substrate 36 increases. Likewise, stress is imparted to the color filter substrate 35 in the tensile mode such that the size of the color filter substrate 35 decreases. The resulting differences between the increased size of the TFT substrate 36 and the decreased size of the color filter substrate 35 generates significant misalignment.

Figure 6:
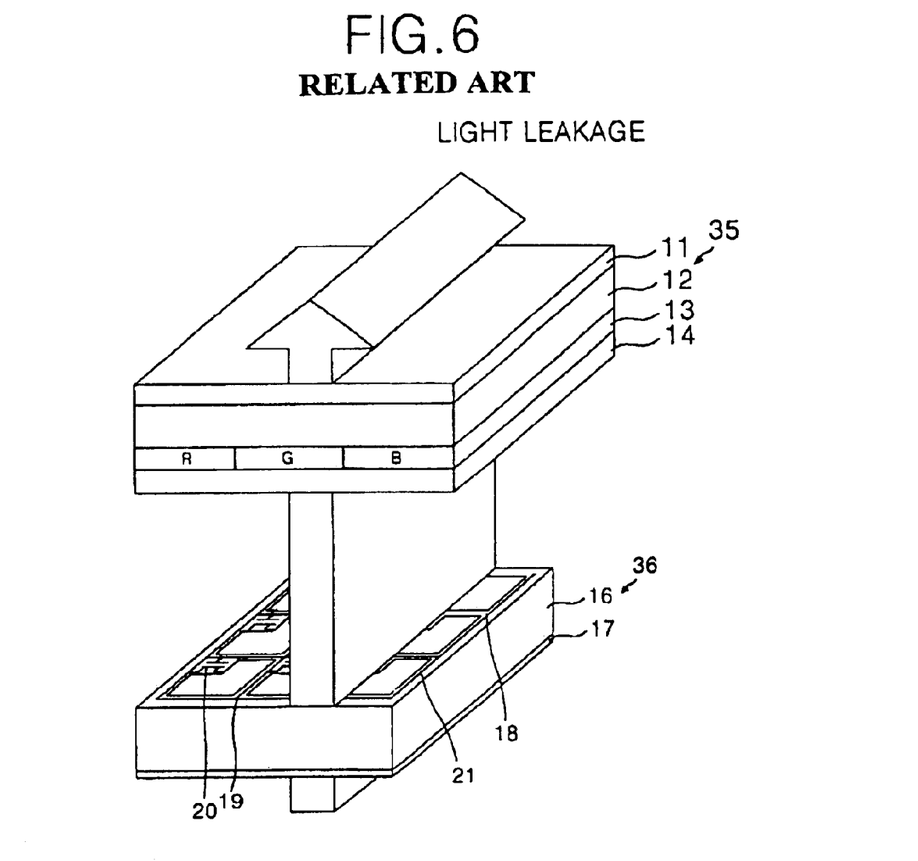
FIG. 6 is a perspective view showing light leakage resulting from misalignment of a color filter substrate and a TFT substrate according to the related art.
Figure 7:
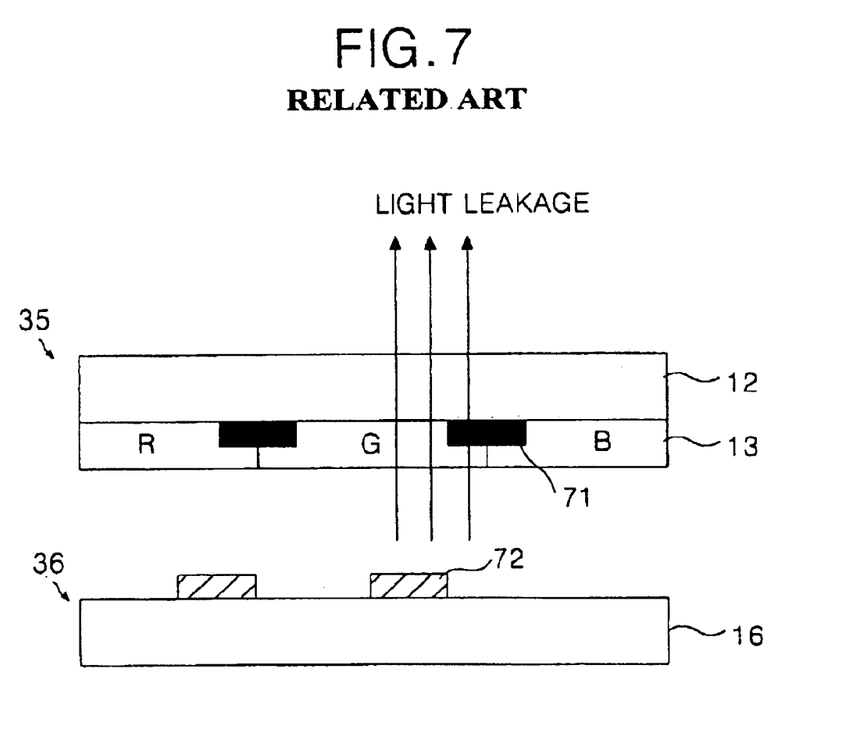
FIG. 7 is a cross sectional view showing light leakage resulting from misalignment between a black matrix on the color filter substrate and a metal pattern on the TFT substrate shown in FIG. 6 according to the related art.

FIG. 6 is a perspective view showing light leakage resulting from misalignment of a color filter substrate and a TFT substrate according to the related art. FIG. 7 is a cross sectional view showing light leakage resulting from misalignment between a black matrix on the color filter substrate and a metal pattern on the TFT substrate shown in FIG. 6 according to the related art.

In FIGS. 6 and 7, if the TFT substrate 36 and the color filter substrate 35 are not accurately sealed, the metal patterns 72, which include the gate and data lines 18 and 19, are not in proper registration with the black matrix 71 formed on the color filter substrate 35. Accordingly, light leakage occurs between adjacent cells because of the inaccurate registration of the black matrix 71 and the metal patterns 72, thereby deteriorating contrast of the display device.

SUMMARY OF THE INVENTION

Accordingly, the present invention is directed to a method of adjusting a substrate size of a liquid crystal display device that substantially obviates one or more of the problems due to limitations and disadvantages of the related art.

An object of the present invention is to provide a method for adjusting a substrate size of a liquid crystal display device in order to ensure accurate registration of the TFT and color filter substrates.

Additional features and advantages of the invention will be set forth in the description which follows, and in part will be apparent from the description, or may be learned by practice of the invention. The objective and other advantages of the invention will be realized and attained by the structure particularly pointed our in the written description and claims hereof as well as the appended drawings.

To achieve these and other advantages and in accordance with the purpose of the present invention, as embodied and broadly described, a method of adjusting a size of a substrate of a liquid crystal display device includes determining if first and second substrates that are sealed together and have a liquid crystal material disposed therebetween are mutually aligned, one of the first and second substrates having a deposition layer formed thereupon, and controlling an amount of deposition stress of the deposition layer when the first and second substrates are not mutually aligned.

In another aspect, a method of fabricating a liquid crystal display device includes applying a first stress to a plurality of substrates, each having different material compositions, measuring a size change of each of the plurality of substrates, determining a first substrate and a second substrate having equivalent size changes from the measured size change of each of the plurality of substrates, and sealing the first and second substrates having a liquid crystal material therebetween.

In another aspect, a liquid crystal display device includes a first substrate including a first deposition layer having a first deposition stress, a second substrate attached to the first substrate, and a liquid crystal material between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 8:
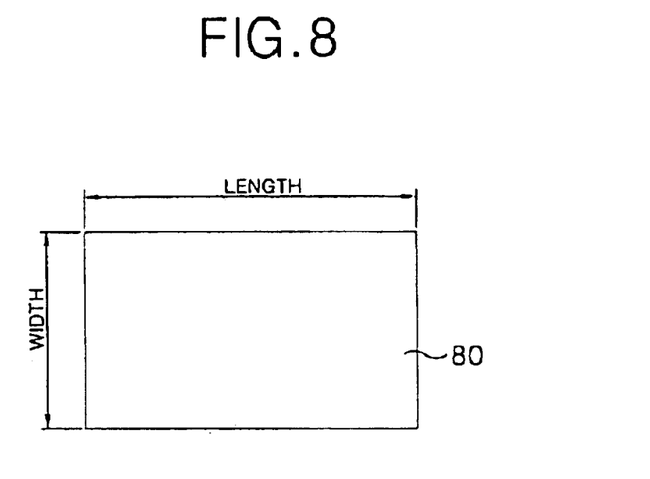
FIG. 8 is a plane view showing relative dimensions of a substrate of an LCD according to the present invention.

FIG. 8 is a plane view showing relative dimensions of a substrate of an LCD according to the present invention. In FIG. 8, a substrate 80 of an LCD device may include an orientation where a length (LENGTH) is longer than a width (WIDTH). Accordingly, a total number of gate lines (not shown) and a total number of data lines (not shown) may be different and sizes of cells may be different along lengthwise and widthwise directions corresponding to the length and width of the substrate 80, respectively.

A method of adjusting a substrate size of liquid crystal display device according to the present invention may use substrates of different materials/quality or may control the deposition conditions of deposition material layers to adjust stresses imparted by the deposition material layers.

Figure 9:
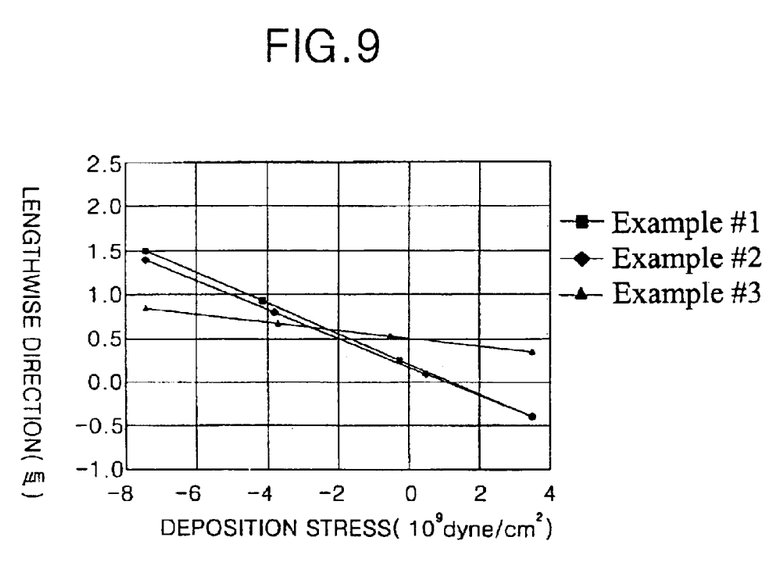
FIG. 9 is a graph showing size changes of substrates having different compositions along a lengthwise direction according to the present invention.
Figure 10:
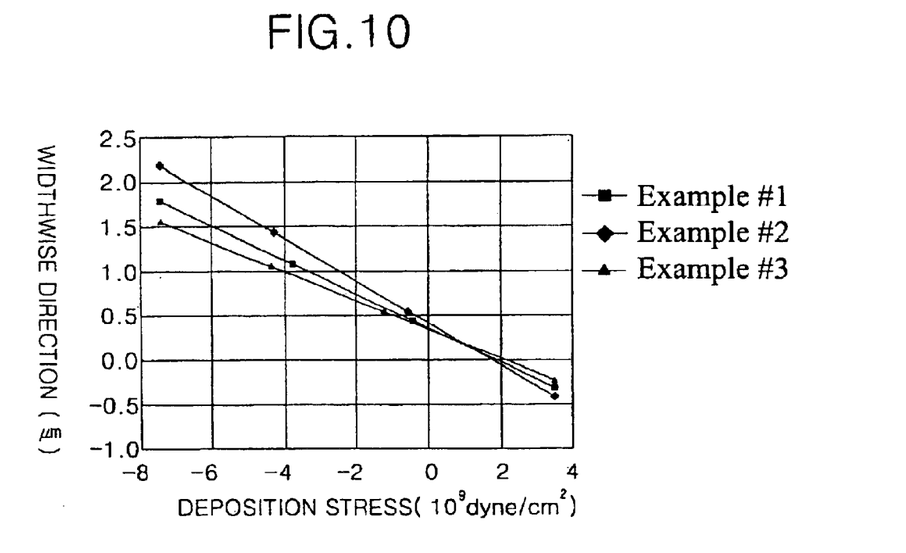
FIG. 10 is a graph showing size changes of substrates having different compositions along a widthwise direction according to the present invention.

FIG. 9 is a graph showing size changes of substrates having different compositions along a lengthwise direction according to the present invention. FIG. 10 is a graph showing size changes of substrates having different compositions along a widthwise direction according to the present invention. In FIGS. 9 and 10, horizontal axes (x) represent deposition stresses (dyne/cm$^2$), and vertical axes (y) represent a change of the size of substrates in accordance with a change of deposition stresses along lengthwise and widthwise directions, respectively.

In FIGS. 9 and 10, a change of size of the substrates is proportional to a change of stress for deposition of materials formed on substrates having dimensions of 670 cm×590 cm. In addition, the substrates may contract or expand within a range of a few $\mu$m in accordance with the corresponding deposition stresses, and the range of the contraction or expansion may vary due to compositional differences between the substrates. Conventionally, if the deposition stresses increase along a positive direction, a tensile stress is imparted to the substrate, and if the deposition stresses increase along a negative direction, a compressive stress is imparted to the substrate. Accordingly, the size of the substrate changes along the negative and positive directions.

The amount of change of the size of the substrates in accordance with a change of the deposition stresses is shown in Table 1.

TABLE 1

| | Lengthwise Direction | | | Widthwise Direction | | |
|---|---|---|---|---|---|---|
| Stress ($10^9$ dyne/cm$^2$) | −7.5 | 0 | 3.5 | −7.5 | 0 | 3.5 |
| Dimensional Change(μm) | | | | | | |
| Example #1 | 1.5 | 0.2 | −0.4 | 1.8 | 0.3 | −0.3 |
| Example #2 | 1.3 | 0.2 | −0.5 | 2.1 | 0.7 | −0.7 |
| Example #3 | 0.9 | 0.5 | −0.4 | 1.5 | 0.2 | −0.2 |

The substrates of Example #1 and Example #2 have material compositions as shown in Table 2.

TABLE 2

| Example #1 | | Example #2 | |
|---|---|---|---|
| Material | Composition (%) | Material | Composition (%) |
| SiO$_2$ | 50–60 | SiO$_2$ | 49 |
| Al$_2$O$_3$ | 10–15 | Al$_2$O$_3$ | 10 |
| B$_2$O$_3$ | 5–10 | B$_2$O$_3$ | 15 |
| BaO | 10–15 | As$_2$O$_3$ | 1 |
| CaO, ZnO, SrO | 5–15 | Alkaline Earth Oxide | 25 |
| MgO, Na$_2$O | ≦0.1 | | |
| K$_2$O, Li$_2$O | ≦0.1 | | |

In accordance with FIGS. 9 and 10, the deposition stress imparted to a first of the substrates may be tensile, thereby reducing the size of the first substrate, and the deposition stress imparted to a second of the substrates may be made compressive, thereby increasing the size of the second substrate. For example, the deposition stress may be increased by about 3×10$^9$ dyne/cm$^2$ along the tensile direction for reducing the size of the substrate of Example #1 by about 0.5 82 m, and the deposition stress may be reduced by about 3×10$^9$ dyne/cm$^2$ along the compressive direction for increasing the size of the substrate of Example #1 by about 0.5 μm. As another example, the deposition stress may be increased or decreased by about 11×10$^9$ dyne/cm$^2$ for a decrease or increase in the size of the substrate of Example #2 by about 0.5 μm.

The deposition stress may be controlled by process variables of the deposition equipment. For example, a radio frequency (RF) power of a PECVD apparatus, which is used for depositing the gate insulating layer 31 or the passivation layer 34 (of FIG. 3), may be decreased, thereby increasing the deposition stress along the tensile direction. In addition, a flow of reaction gases such as nitrogen (N$_2$) used in the PECVD apparatus may be reduced, thereby increasing the deposition stress along the tensile direction. Conversely, the RF power and the flow of reaction gases may be individually increased, thereby increasing the deposition stress along the compressive direction.

Figure 11:
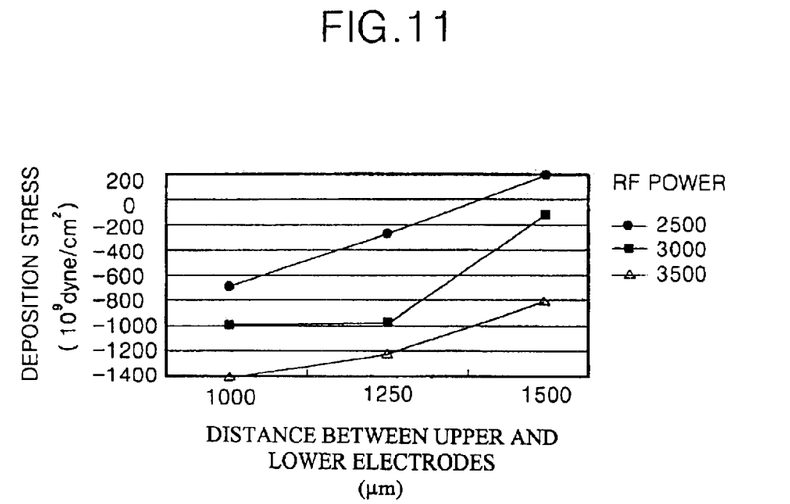
FIG. 11 is a graph showing deposition stress between spaced apart upper and lower electrodes at different deposition radio frequencies according to the present invention.

FIG. 11 is a graph showing deposition stress between spaced apart upper and lower electrodes at different deposition radio frequencies according to the present invention. In FIG. 11, horizontal axis (x) represents a distance between upper and lower electrodes of a PECVD apparatus in units of μm, and vertical axis (y) represents a deposition stress on the substrate in units of dyne/cm$^2$. As shown in FIG. 11, the deposition stress and the RF power of the PECVD apparatus are inversely proportional. That is, an increase in the RF power of the PECVD apparatus is proportional to an increase of the deposition stress along the tensile direction. Conversely, a decrease in the RF power of the PECVD apparatus is proportional to an increase of the deposition stress along the compressive direction.

The method of adjusting the substrate size of an LCD device according to the present invention uses substrates having different material compositions. Accordingly, sizes of the different material substrates are changed by different amounts even though the amount of deposition stress is about equal. For example, the TFT substrate 36 and the color filter substrate 35 (of FIG. 1) may be accurately sealed by adjusting the deposition stress of the gate insulating layer 31 or the passivation layer 34 (of FIG. 1).

In order to accurately seal the color filter substrate 35 and the TFT substrate 36 (of FIG. 1), the size change is measured in accordance with the corresponding amount of deposition stress for each of the substrates. Accordingly, the size change of the color filter substrate 35 and the TFT substrate 36 may be determined in accordance with the material compositions of the color filter and TFT substrates 35 and 36. Moreover, the selection of the color filter substrate 35 and the TFT substrate 36 may be made in accordance with a desired size change. In either case, the color filter substrate 35 and the TFT substrate 36 may be selected for creating an accurate seal between the two.

An exemplary method of adjusting the size of the substrate having the passivation layer 34 according to the present invention may be explained with reference to FIGS. 1 to 3 and 12A and 12B. After first sealing the color filter substrate 35 and the TET substrate 36, a test may be performed to determine whether or not light leakage occurs. During the test, the color filter substrate 35 and the TFT substrate 36 may not be permanently sealed together, but instead temporarily joined together for easy separation.

Figure 12A:
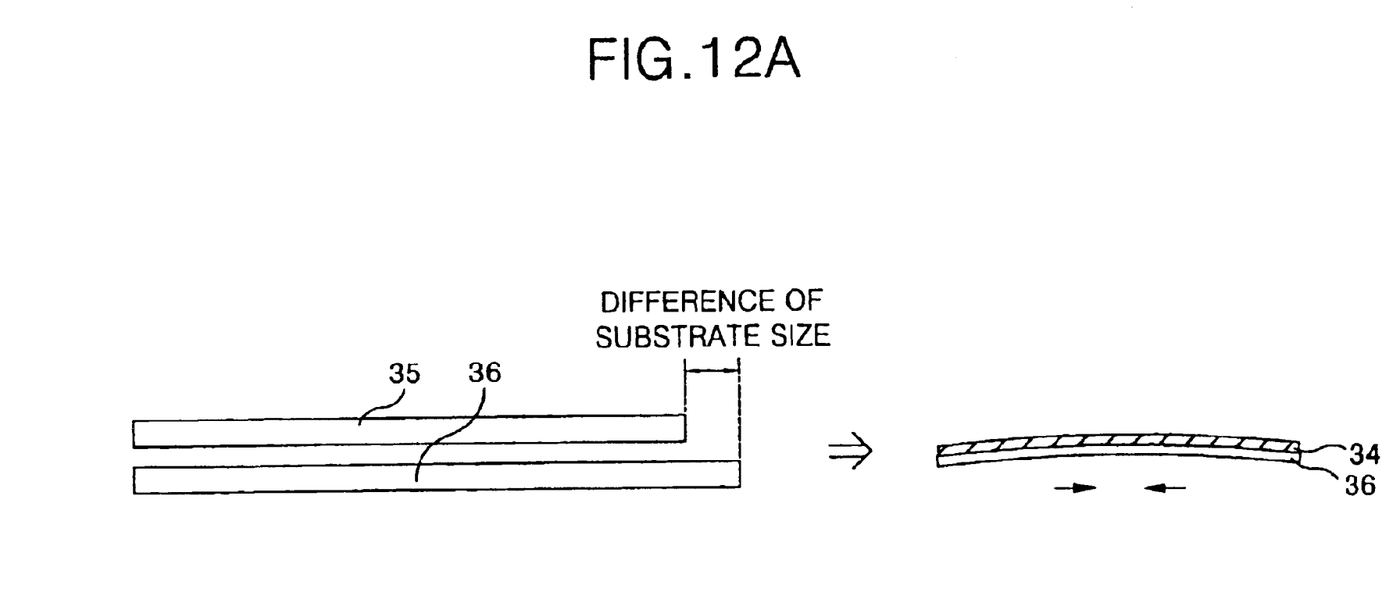
FIGS. 12A and 12B are a schematic block diagrams of exemplary methods according to the present invention.
Figure 12B:
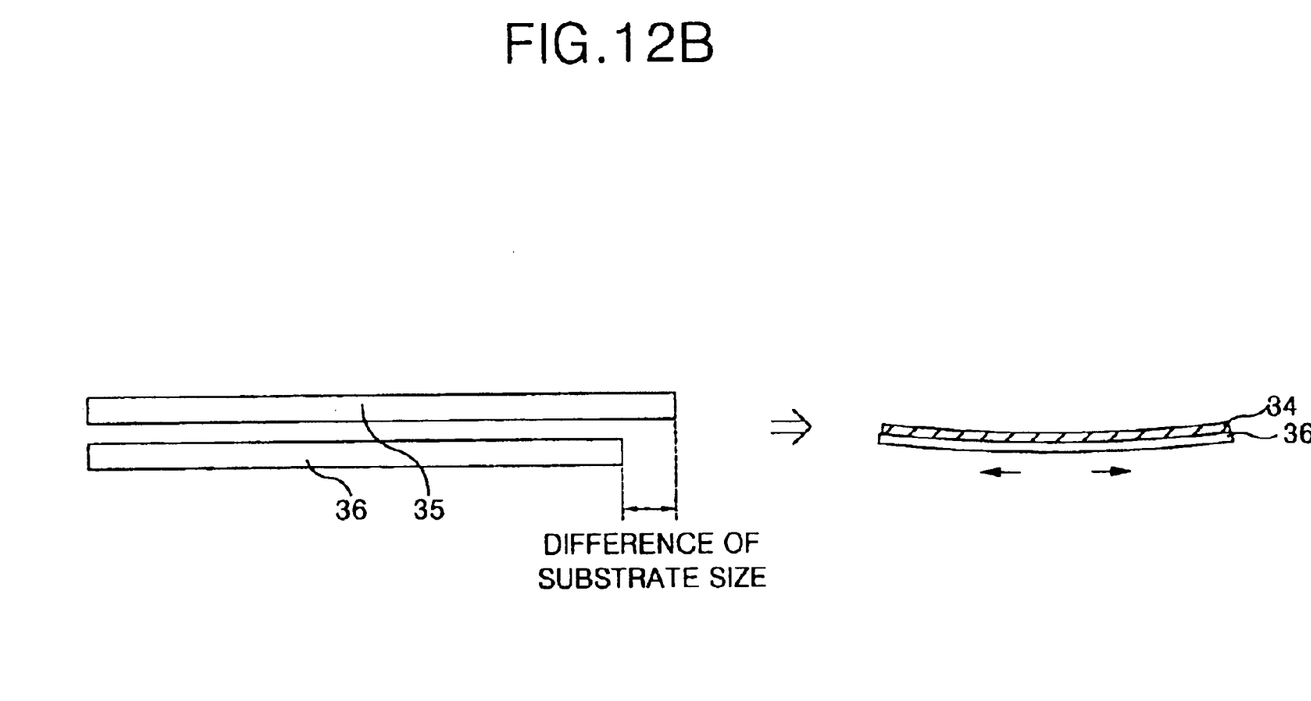

If during the test it is determined that a significant amount of light leakage occurs, whereby the color filter substrate 35 and the TFT substrate 36 are properly aligned, the RF power of the PECVD apparatus or the flow of reaction gases may be adjusted during the process of forming the passivation layer 34 on the TFT substrate 36. Since the size of the TFT substrate 36 may be changed within the range of a few μm during the deposition process of forming the passivation layer 34, the size of the TFT substrate 36 may be adjusted to be accurately sealed with the color filter substrate 35. Accordingly, if the size of the TFT substrate 36 is adjusted to the desired size, a sealant (not shown) may be spread on the color filter substrate 35 and the TFT substrate 36, thus permanently sealing together the color filter substrate 35 and the TFT substrate 36.

Alternatively, the color filter substrate 35 and the TFT substrate 36 may be accurately sealed during the substrate sealing process by adjusting the process variables for forming the gate insulating layer 31. For example, the RF power or the flow of reaction gases of the PECVD apparatus may be adjusted accordingly.

As described above, the exemplary method of adjusting the substrate size of the LCD device according to the present invention may control the process factors in order to adjust the size of the substrate. Alternatively, color filter and TFT substrates each of different material compositions may be used in order to adjust the size of the substrates. In either case, accurately sealing of the color filter substrate with the TFT substrate may be achieved.

It will be apparent to those skilled in the art that various modifications and variations can be made in the method of adjusting a substrate size of a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of adjusting a size of a substrate of a liquid crystal display device, comprising:

determining if first and second substrates that are sealed together and have a liquid crystal material disposed therebetween are mutually aligned, one of the first and second substrates having a deposition layer formed thereupon; and controlling an amount of deposition stress of the deposition layer when the first and second substrates are not mutually aligned, wherein controlling an amount of deposition stress includes adjusting a size of the one of the first and second substrates having the deposition layer formed thereupon.

2. The method according to claim 1, wherein the first substrate is a thin film transistor substrate having intersecting signal lines along a first direction and a second direction perpendicular to the first direction, and thin film transistors formed at the intersecting signal lines.

3. The method according to claim 1, wherein the second substrate is a color filter substrate having a plurality of color filters, and a black matrix formed between the color filters.

4. The method according to claim 1, wherein controlling an amount of deposition stress includes changing process parameters of a deposition process.

5. The method according to claim 4, wherein the process parameters include a radio frequency power of a deposition apparatus and a gas flow amount provided into a vacuum chamber of the deposition apparatus.

6. The method according to claim 5, wherein a size of the one of the first and second substrates having a deposition layer formed thereon is increased by an increase in the radio frequency power of the deposition apparatus.

7. The method according to claim 5, wherein a size of the one of the first and second substrates having a deposition layer formed thereon is decreased by a decrease in the radio frequency power of the deposition apparatus.

8. The method according to claim 5, wherein a size of the one of the first and second substrates having a deposition layer formed thereon is increased by an increase in the gas flow amount.

9. The method according to claim 5, wherein a size of the one of the first and second substrates having a deposition layer formed thereon is decreased by a decrease in the gas flow amount.

10. The method according to claim 1, wherein the deposition layer includes a gate insulating layer deposited on an entire surface of the substrate covering a gate line and a gate electrode of a thin film transistor.

11. The method according to claim 10, wherein the gate insulating layer includes an inorganic material.

12. The method according to claim 11, wherein the inorganic material includes at least one of $SiN_x$ and $SiO_x$.

13. The method according to claim 1, wherein the deposition layer includes a passivation layer deposited on an entire surface of the substrate covering a thin film transistor and a plurality of signal lines.

14. The method according to claim 13, wherein the passivation layer includes an inorganic material.

15. The method according to claim 14, wherein the inorganic material includes at least one of $SiN_x$ and $SiO_x$.

16. A method of fabricating a liquid crystal display device, comprising:

applying a first stress to a plurality of substrates, each having different material compositions;

measuring a size change of each of the plurality of substrates;

determining a first substrate and a second substrate having equivalent size changes from the measured size change of each of the plurality of substrates; and sealing the first and second substrates having a liquid crystal material therebetween.

17. The method according to claim 16, wherein the first substrate is a thin film transistor substrate having intersecting signal lines along a first direction and a second direction perpendicular to the first direction, and thin film transistors formed at the intersecting signal lines.

18. The method according to claim 16, wherein the second substrate is a color filter substrate having a plurality of color filters, and a black matrix formed between the color filters.

* * * * *